(12) United States Patent
Macfarlane

(10) Patent No.: US 12,016,488 B1
(45) Date of Patent: Jun. 25, 2024

(54) COOKWARE HANDLING AND MAINTENANCE SYSTEM

(71) Applicant: Alexander John Macfarlane, London (GB)

(72) Inventor: Alexander John Macfarlane, London (GB)

(*) Notice: Subject to any disclaimer, the term of this patent is extended or adjusted under 35 U.S.C. 154(b) by 0 days.

(21) Appl. No.: 18/239,616

(22) Filed: Aug. 29, 2023

(51) Int. Cl.
*A47J 36/34* (2006.01)
*A47J 45/10* (2006.01)

(52) U.S. Cl.
CPC ............... *A47J 36/34* (2013.01); *A47J 45/10* (2013.01)

(58) Field of Classification Search
CPC .................................. A47J 36/34; A47J 45/10
USPC .................................................. 248/633, 634
See application file for complete search history.

(56) References Cited

U.S. PATENT DOCUMENTS

| | | | | |
|---|---|---|---|---|
| 4,001,904 | A * | 1/1977 | Gill | B67B 7/18 |
| | | | | 81/3.4 |
| 4,320,699 | A * | 3/1982 | Binks | A47J 36/022 |
| | | | | 220/573.1 |
| 10,758,082 | B2 * | 9/2020 | Bazley | A47J 36/34 |
| 2003/0141308 | A1 * | 7/2003 | Barniak, Jr. | A47J 36/34 |
| | | | | 220/573.4 |
| 2007/0199943 | A1 * | 8/2007 | Waldman | A47J 45/10 |
| | | | | 220/573.3 |
| 2008/0245947 | A1 * | 10/2008 | Webb | A47G 19/10 |
| | | | | 108/180 |
| 2009/0184228 | A1 * | 7/2009 | Lion | A47J 36/34 |
| | | | | 248/346.01 |
| 2011/0174942 | A1 | 7/2011 | Moberg | |
| 2020/0170450 | A1 | 6/2020 | Goldson et al. | |

* cited by examiner

*Primary Examiner* — Muhammad Ijaz
(74) *Attorney, Agent, or Firm* — Plager Schack LLP; Mark H. Plager; Naomi Mann

(57) ABSTRACT

Disclosed is trivet and cookware protector system, generally comprising a multiuse kitchen device, which may serve as both a trivet or cookware protection liner in different modes of use.

7 Claims, 5 Drawing Sheets

COOKWARE HANDLING AND MAINTENANCE SYSTEM

BACKGROUND

The present disclosure relates generally to kitchen systems and devices.

Kitchen cookware, particularly non-stick or other metal pans, may be subject to scratches and other forms of wear and tear. Additionally, placing hot cookware on a kitchen countertop or table surface may cause damage to the surface. While this may be avoided using a trivet, consumers may be deterred from owning trivets due to lack of space and/or a desire to avoid clutter.

As such, an improved kitchen maintenance system that addresses the above-mentioned problems is desirable.

SUMMARY

Disclosed is a cookware handling and maintenance system, generally comprising providing a multiuse kitchen device which may serve as both a trivet or cookware protection liner in different modes of use.

According to various embodiments, the multiuse kitchen device may comprise a first layer flexible mat made of a heat-resistant material and comprising a central portion and arms that extend linearly outwards from the central portion, said arms being configured to bend from the central portion; wherein the multiuse kitchen device is configured for alternative uses including a trivet, and a cookware protection liner, wherein the first layer is configured to lay flat on a surface when used as a trivet, such that the arms are in planar alignment with the central portion, and wherein the first layer is configured to line and protect an inner surface of a cookware item by placing the first layer inside the cookware item with the central portion covering at least part of an inner bottom surface of the cookware item and the arms bending upwards to cover part of the side wall of the cookware item. In some embodiments, the multiuse kitchen device may further comprise first layer slots and/or first layer tabs formed within the arms of the first layer. In further embodiments, the multiuse kitchen device may comprise a second layer flexible mat made of a heat-resistant material and comprising a central portion and arms that extend linearly outwards from the central portion, said arms being configured to bend from the central portion, the second layer further comprising at least one of second layer slots and second layer tabs formed within the arms of the second layer, wherein the first layer and the second layer are configured to overlay one another and interconnect via mating between the first layer slots and the second layer tabs and/or mating between the first layer tabs and the second layer slots.

BRIEF DESCRIPTION OF THE FIGURES

The detailed description of some embodiments of the invention will be made below with reference to the accompanying FIGURES, wherein the FIGURES disclose one or more embodiments of the present invention.

DETAILED DESCRIPTION OF CERTAIN EMBODIMENTS

According to various embodiments as depicted in FIGS. 1-7, disclosed is a cookware handling and maintenance system, comprising a multiuse kitchen device 10, which may serve as both a trivet or cookware protection liner in different modes of use. When used as a trivet, device 10 may be laid flat and placed on a surface to provide a heat resistant barrier between the surface and a hot cookware item 40 (e.g., pan, pot, dish) placed on device 10. When used as a cookware protector, device 10 may be laid inside cookware 40 to protectively line its inner surface, wherein device 10 may bend or curve to conform to the shape of the cookware.

In certain embodiments, device 10 may be made of a heat-resistant silicone material, which is also bendable, enabling its dual use in providing a barrier against heat damage and scratches. In some embodiments, device 10 may comprise a central portion 10A, and tentacles or arms 10B that extend linearly and radially outwards from central portion 10A and are configured to bend from central portion 10A. In one embodiment, device 10 may comprise 6 arms 10B extending in symmetry from central portion 10A, wherein central portion 10A may have a generally hexagonal geometry and each arm is generally rectangular, as shown in the FIGURES. It shall be appreciated however, that device 10 may comprise any number of arms 10B, and that central portion 10A and arms 10B may be of various geometric configurations in alternate embodiments.

Figure 1:
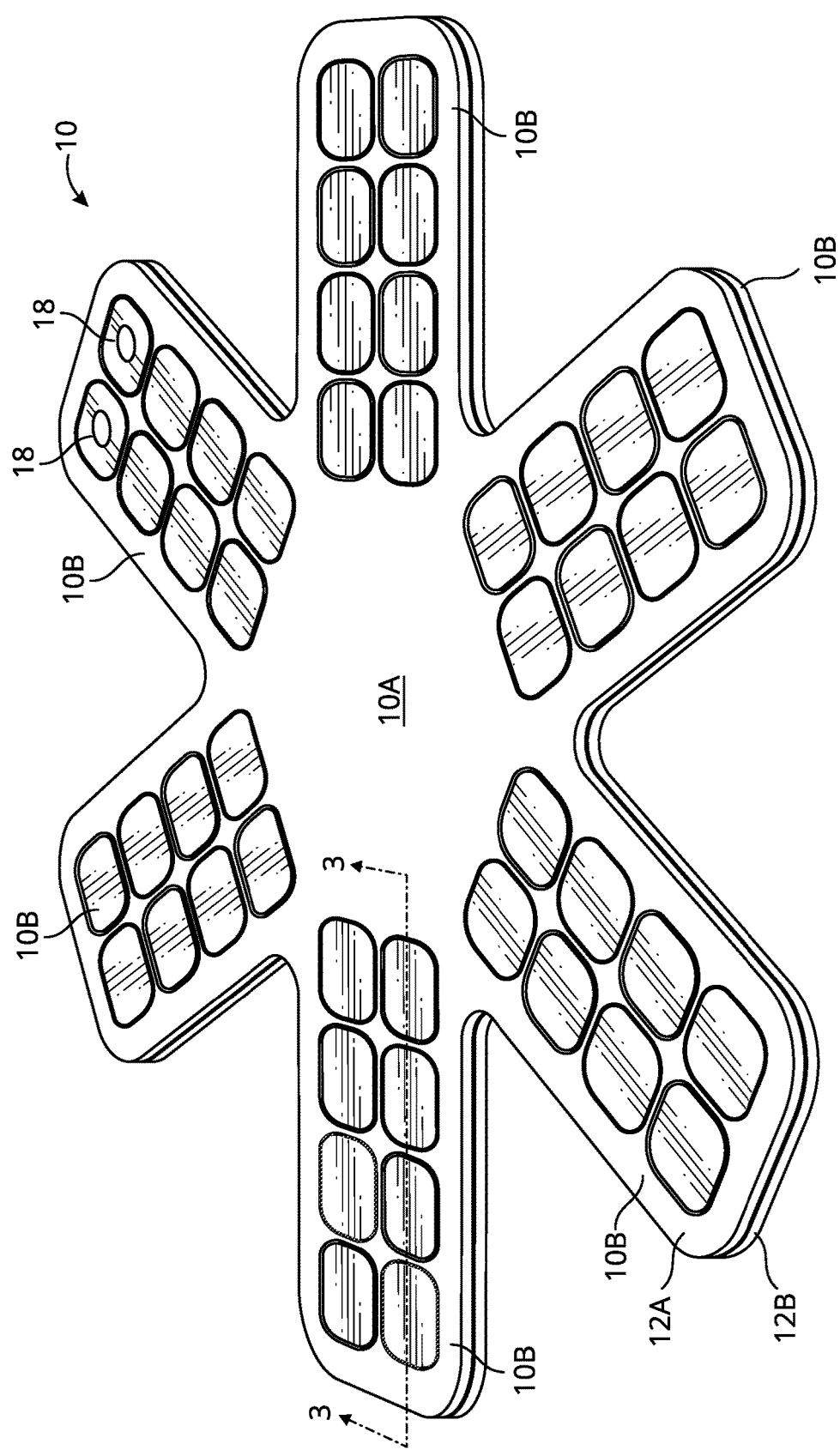
FIG. 1 is a perspective view of a double layer multiuse kitchen device, according to various embodiments.
Figure 2:
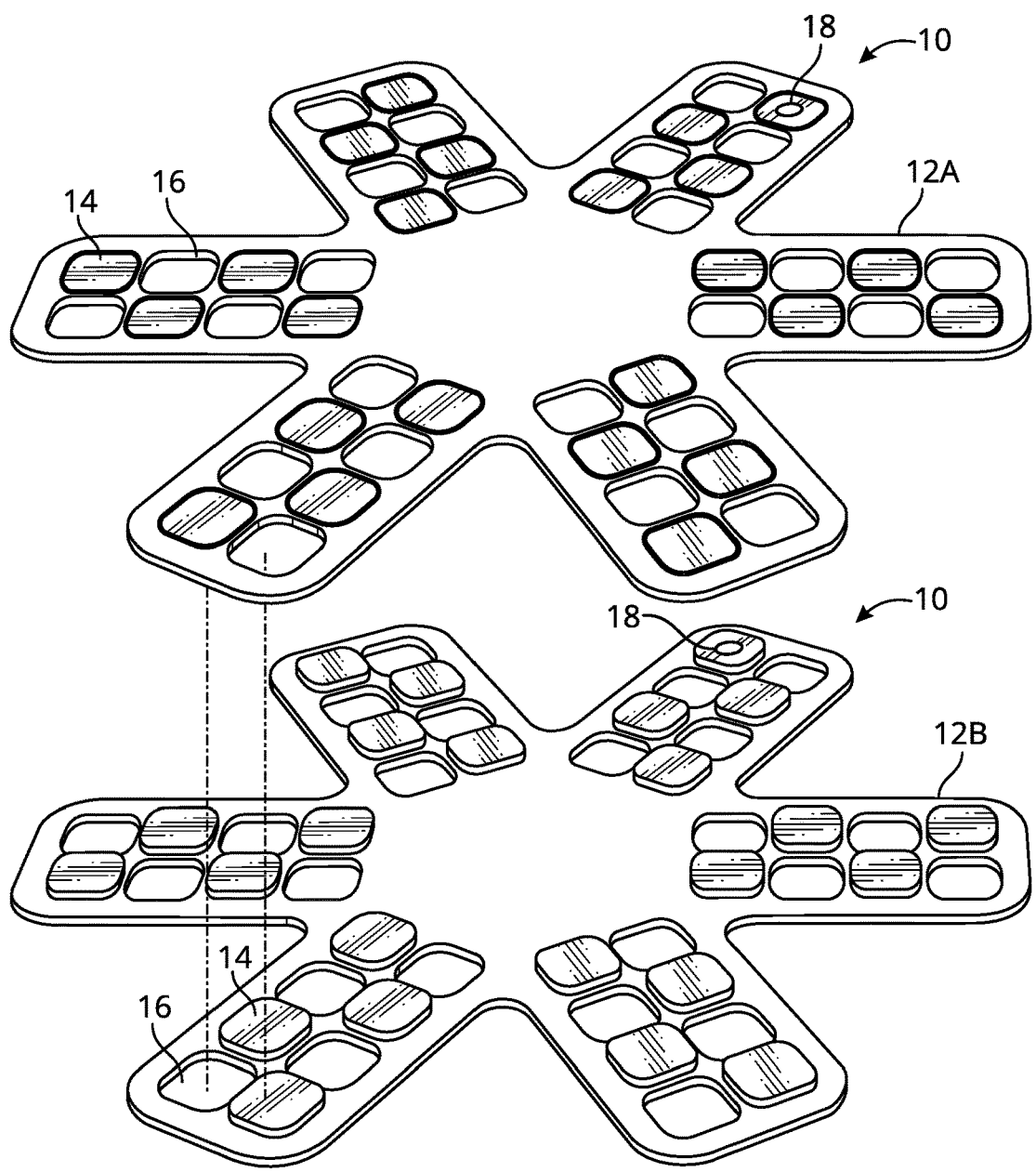
FIG. 2 shows the device of FIG. 1 with the double layers of the device separated from one another.
Figure 3:
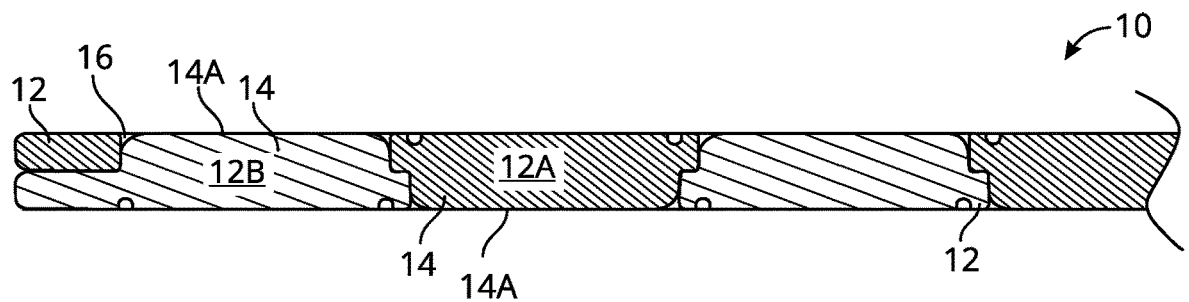
FIG. 3 is a section view of the device, taken along line 3-3 in FIG. 1.
Figure 4:
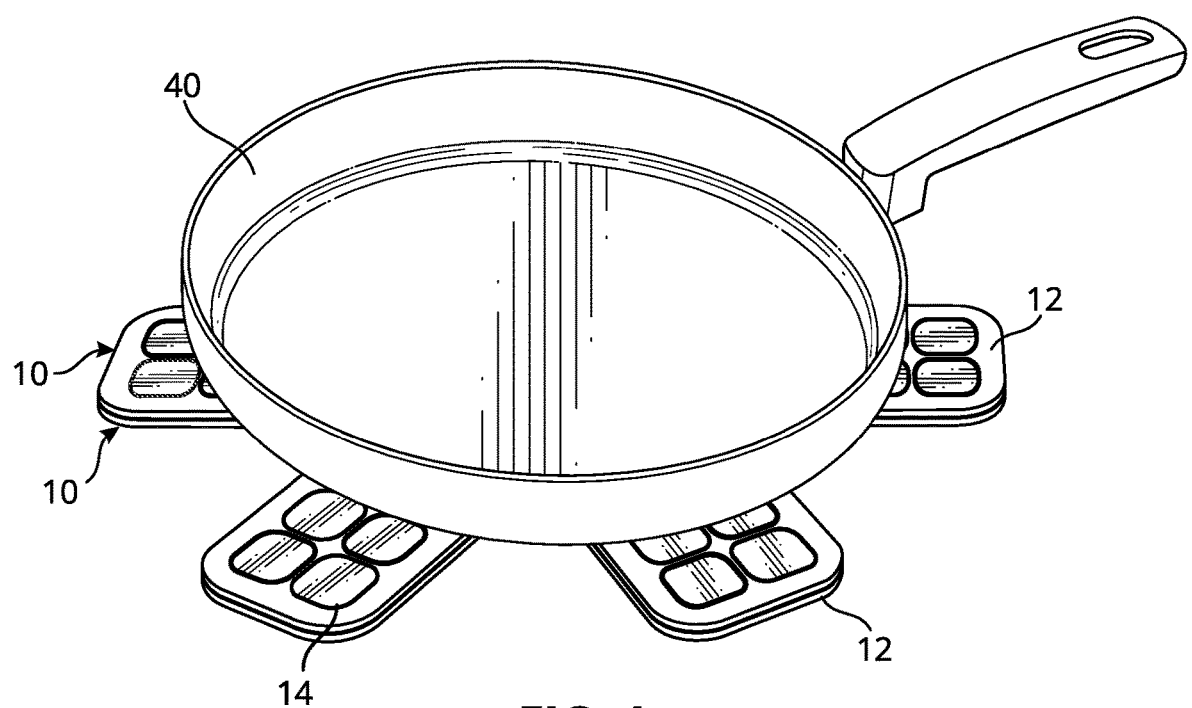
FIG. 4 is a perspective view of the multiuse kitchen device, shown in use as a double layer trivet, according to certain embodiments.

In further embodiments, device 10 may be formed from two overlaying heat-resistant, silicone layers 12, i.e., a first silicone layer 12A ("top layer 12A"), and a second silicone layer 12B ("bottom layer 12B"). The two layers 12A and 12B are configured to interlock via mating tabs 14 and slots 16 provided at corresponding locations on each layer. More specifically, each layer includes tabs 14 that protrude perpendicularly from the planer surface of the layer and are configured to fit into slots 16 within the other layer when first layer 12A and second layer 12B are overlayed. In certain embodiments, the tabs 14 in bottom layer 12B are raised from the planar surface of the bottom layer, and the tabs 14 in top layer 12A are lowered from the planar surface of the top layer. In further embodiments, the thicknesses of layer 12A, layer 12B, and tabs 14 are approximately equal. As such, when layers 12A and 12B are joined via interlocking between their tabs and slots, the distal surface 14A of each tab sits flush with respect to the exposed surface of the tab's receiving layer, so that device 10 is evenly flat throughout both its top and bottom exposed surfaces, as best depicted in FIGS. 2 and 4. It shall be appreciated that terms such as "top," "bottom," "raised," "lowered," are used for convention only and do not imply a necessary orientation.

In certain embodiments, an array of tabs 14 and slots 16 are provided on each arm. In further embodiments, tabs 14 and slots 16 may be arranged in an alternating pattern. In one embodiment as depicted in the FIGURES, each arm 10B may comprise a two by four, column to row array of tabs and slots, wherein each row includes one tab 14 and one slot 16, with the tab and slot in any one row arranged in opposite order with respect to the tab and slot in the adjacent row. In some further embodiments, each tab and slot may have a square or rectangular geometry, which may further be rounded at the corners. It shall be appreciated that any number of tabs and slots may be provided in alternate embodiments. It shall be appreciated that the number of tabs and slots, their arrangement, and their geometric shape(s), size(s), and/or dimensions may vary in alternate embodiments, based on factors such as the size and/or shape of the mat, design preference, application needs, material availability, costs, etc. In some embodiments, one layer may comprise only slots and the other layer may comprise only tabs.

Figure 6:
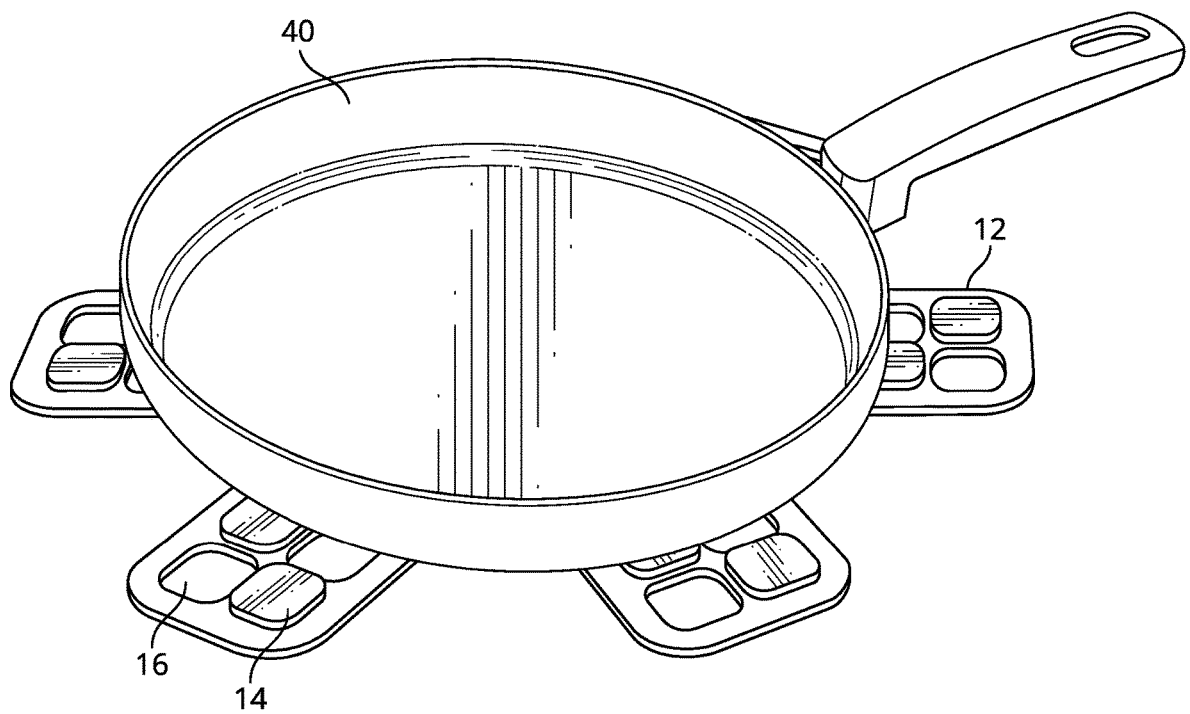
FIG. 6 is a perspective view of the device shown in use as a single layer trivet and with upward oriented tabs according to certain embodiments.
Figure 7:
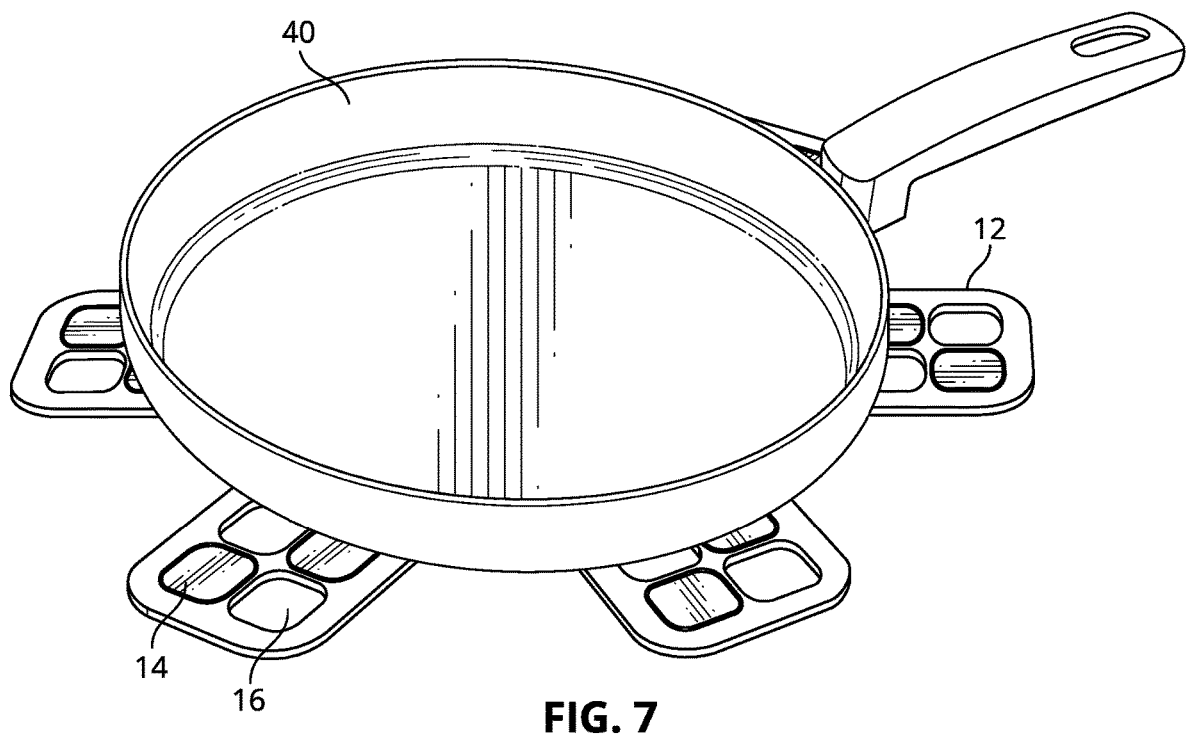
FIG. 7 is a perspective view of the device shown in use as a single layer trivet and with downward oriented tabs according to a further embodiment.

Device 10 may be used as both a trivet and as a cookware protector in alternate modes of use. In one embodiment as best depicted in FIG. 4, device 10 may be used as a trivet with both layers 12A, 12B joined. In other embodiments, as best depicted in FIGS. 6 and 7, the layers 12A and 12B may be separated, and each may be used as a trivet independently. In some embodiments, tabs 14 may face upwards as shown in FIG. 6; in other embodiments, tabs 14 may face downwards as shown in FIG. 7.

Figure 5:
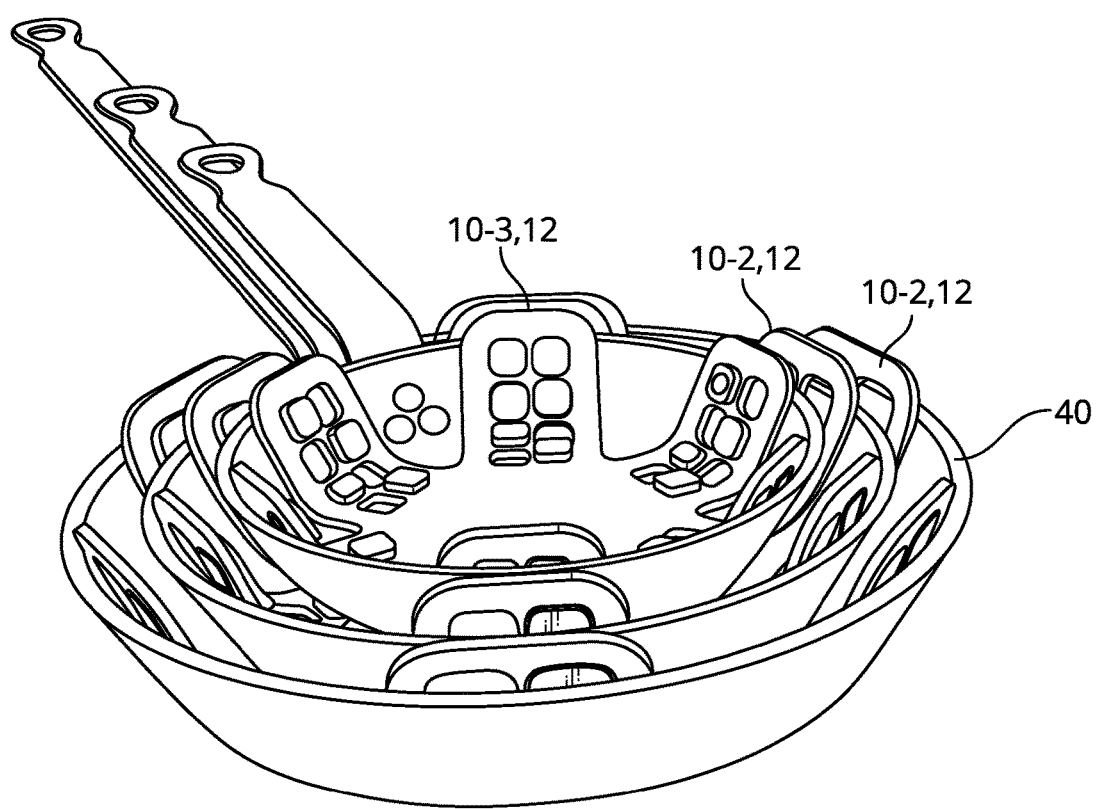
FIG. 5 shows a set of the multiuse devices, shown in use as single layer cookware protectors for storage of multiple pans, according to various embodiments.
Figure 8:
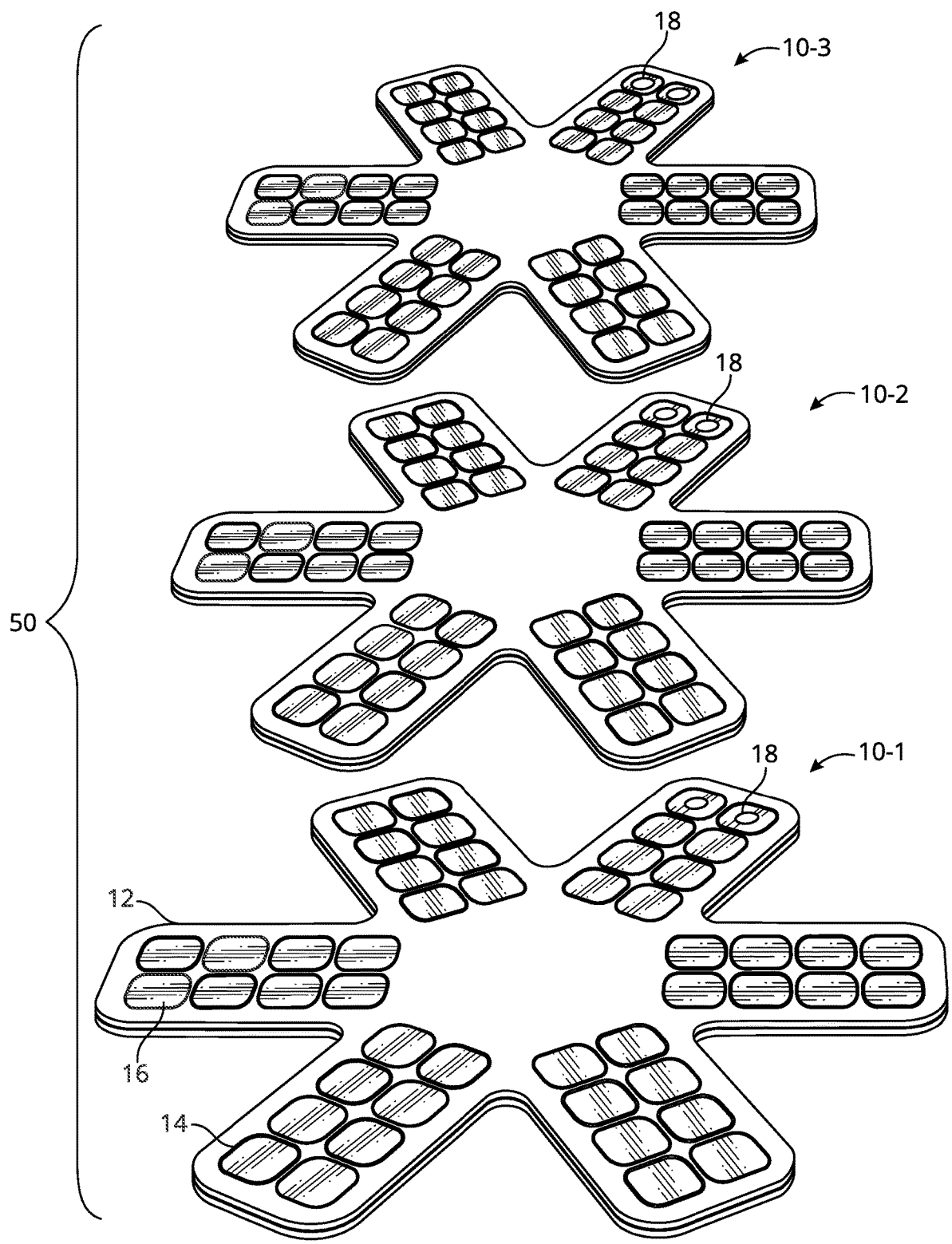
FIG. 8 is a perspective view of a set of the devices, according to various embodiments.

In certain embodiments as best depicted in FIG. 5, the separated layers 12A and/or 12B may each be used independently as a cookware protector by placing one layer 12 inside the cookware to protect its inner surface, wherein central portion 10A substantially covers the center of the cookware, and arms 10B may bend to substantially cover the side wall of the cookware. In this manner, other items may be placed inside cookware 40 for compact storage of multiple items. In one embodiment, a set 50 of different sized mats 10, e.g., large 10-1, medium 10-2, and small 10-3, may be provided for stacking multiple cookware items, e.g., pans, of different sizes within one another, as shown in FIGS. 5 and 8. The silicone material protects the internal surface of each pan from scuffs and scratches by first providing a barrier between stacked pans, and secondly, by preventing the pans from sliding against one another.

Thus, the disclosed subject matter provides a versatile, heat-resistant silicone trivet and cookware protector system for scratch-free cookware and insulated kitchen surfaces. The disclosed system prevents damage to kitchen surfaces and cookware caused by heat, scratches, and scuffs during cooking and storage. As each trivet serves a dual purpose, and does not require its own storage space, a consumer may be more incentivized to purchase one or a set of multiple devices for a well-maintained kitchen environment.

It shall be appreciated that the disclosed device and system may have different configurations in alternate embodiments and may be adapted for other uses. For example, the device may serve as a jar opener, as the silicone material and textured surface provide added grip for opening tight lids on jars or bottles. In further embodiments, device 10 may be used as a potholder for safely handling hot pots, pans, or other cookware, due to the heat-resistant nature of the material. In further embodiments, device 10 may be used as a table placemat, serving as a décor item, as well as protecting dining surfaces from hot plates or bowls during mealtime and ensuring that the surface remains unscathed. In further embodiments, device 10 may be used as a cushioning material for delicate items during storage or transportation, providing an additional layer of protection from potential damage. The device may also be hung for storage, using slots 16, or may be provided with a hanging hole 18. Additional textures and/or patterns may also be provided to better adapt to various uses, e.g., enhancing grip, stability, ensuring cookware remains securely in place during use, etc. All of the above-mentioned uses render device 10 as a versatile and multifunctional tool for the kitchen and overall home needs. It shall be appreciated that the device and system described herein may comprise any alternative known materials in the field and be of any color, size, and/or dimensions. In certain embodiments, device 10 may be made from a high-quality, food-grade, heat-resistant and durable silicone material that is effective in protecting surfaces and cookware from heat and scratches. Such material may be washable and/or dishwasher safe. However, other heat resistant materials may be used in alternate embodiments.

It shall be appreciated that device 10 may be manufactured and assembled using any known techniques in the field. In one embodiment, device 10 may be made using a 3D CAD models for layers 12A and 12B, ensuring that the tabs and slots within the layers are configured to interconnect. Molds may then be developed based on the CAD models for producing device 10 using injection molding.

It shall be understood that the orientation or positional relationship indicated by terms such as "upper", "lower", "front", "rear", "left", "right", "top", "bottom", "inside", "outside" is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles "a" and "an" are intended to include one or more items and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A multiuse kitchen device, comprising:
a first layer mat made of a heat-resistant material and comprising a central portion and arms that extend linearly outwards from the central portion, said arms being configured to bend from the central portion,
wherein first layer slots and/or first layer tabs are formed within the arms of the first layer mat,
wherein the multiuse kitchen device is configured for alternative uses including a trivet, and a cookware protection liner,
wherein the first layer mat is configured to lay flat on a surface when used as a trivet, such that the arms of the first layer mat are in planar alignment with the central portion of the first layer mat,
wherein the first layer mat is configured to line and protect an inner surface of a cookware item by placing the first layer mat inside the cookware item with the central portion of the first layer mat covering at least part of an inner bottom surface of the cookware item and the arms of the first layer mat bending upwards to cover part of the side wall of the cookware item; and
a second layer mat made of a heat-resistant material and comprising a central portion and arms that extend linearly outwards from the central portion, said arms of the second layer mat being configured to bend from the central portion of the second layer mat, the second layer mat further comprising at least one of second layer slots and second layer tabs formed within the arms of the second layer mat,
wherein the first layer mat and the second layer mat have sufficient flexibility to accommodate the shape of the cookware item, and
wherein the first layer mat and the second layer mat are configured to overlay one another and interconnect via mating between the first layer slots and the second layer tabs and/or mating between the first layer tabs and the second layer slots.

2. The multiuse kitchen device of claim 1, wherein the first layer mat and the second layer mat are substantially identical, and wherein each layer is configured to be used as a cookware protector liner by itself and is further configured to be used as the trivet when interlocked with the other layer or by itself.

3. The multiuse kitchen device of claim 1, wherein the heat-resistant material is silicone.

4. A cookware handling and maintenance method, comprising:
providing a multiuse kitchen device comprising a first layer mat made of a heat-resistant material and including a central portion and arms that extend linearly outwards from the central portion, said arms being configured to bend from the central portion,
wherein at least one of first layer slots and first layer tabs are formed within the arms of the first layer mat,
wherein the multiuse kitchen device is configured for alternative uses including a trivet, and a cookware protection liner,
laying the first layer mat flat on a surface for use as a trivet, such that the arms of the first layer mat are in planar alignment with the central portion of the first layer mat,
lining at least a portion of an inner surface of a cookware item by placing the first layer mat inside the cookware item with the central portion of the first layer mat covering at least a portion of an inner bottom surface of the cookware item and the arms of the first layer mat bending upwards to cover a portion of a side wall of the cookware item, such that the first layer mat protects said inner surface,
the multiuse kitchen device further comprising a second layer mat made of a heat-resistant material and comprising a central portion and arms that extend linearly outwards from the central portion, said arms of the second layer mat being configured to bend from the central portion of the second layer mat, the second layer mat further comprising at least one of second layer slots and second layer tabs formed within the arms of the second layer mat,
wherein the first layer mat and the second layer mat have sufficient flexibility to accommodate the shape of the cookware item, and
wherein the first layer mat and the second layer mat are configured to overlay one another and interconnect via mating between the first layer slots and the second layer tabs and/or mating between the first layer tabs and the second layer slots.

5. The cookware handling and maintenance method of claim 4,
wherein the first layer mat and the second layer mat are substantially identical, and wherein each layer is configured to be used as a cookware protector liner by itself, and is further configured to be used as the trivet when interlocked with the other layer or by itself.

6. The cookware handling and maintenance method of claim 4, wherein the heat-resistant material is silicone.

7. The cookware handling and maintenance method of claim 4, further comprising using the first layer mat for added grip and/or for thermal insulation when holding a hot or cold item.

* * * * *